Aug. 27, 1946. A. G. FAWNS 2,406,533
PISTON RING EXPANDER
Filed July 28, 1944
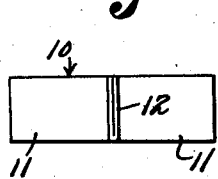
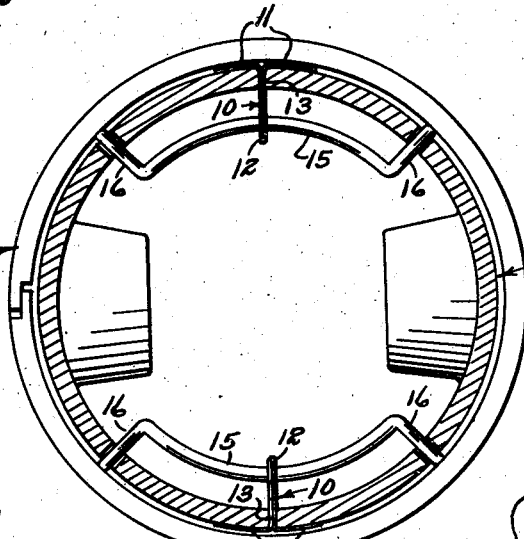
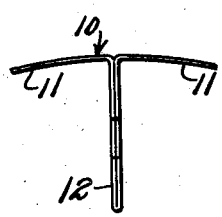
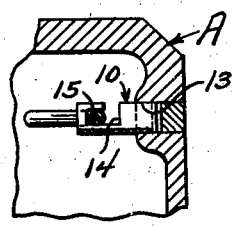
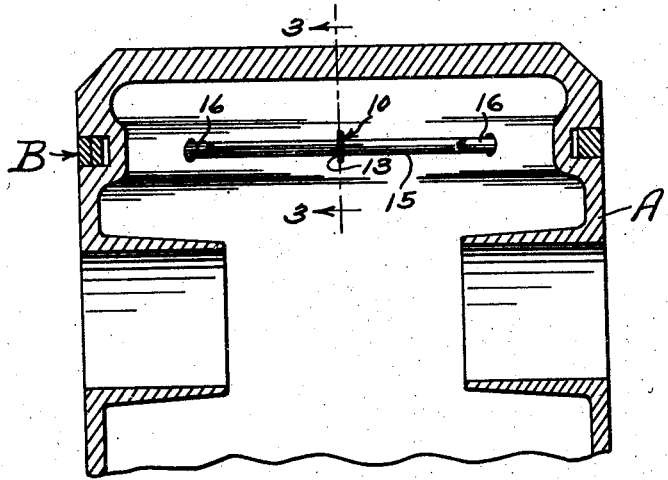
INVENTOR.
Alexander G. Fawns
BY
Victor J. Evans & Co.
ATTORNEYS Patented Aug. 27, 1946

2,406,533

UNITED STATES PATENT OFFICE 2,406,533

PISTON RING EXPANDER

Alexander G. Fawns, Philadelphia, Pa.

Application July 28, 1944, Serial No. 546,952

4 Claims. (Cl. 309—41)

The invention relates to an expander device for use of pistons of internal combustion engines, or the like, and more especially to a piston ring expanding device.

The primary object of the invention is the provision of a device of this character, wherein on application thereof to a piston, it effects a steady pressure of the piston ring over the entire circumference of the cylinder and maintains that pressure at all times during the working of the piston within the cylinder.

Another object of the invention is the provision of a device of this character, wherein the result therefrom is to maintain an even wear of the cylinder wall, keeping it round and preventing the same wearing egg-shape, it also increasing volumetric efficiency of the cylinder by reducing leakage past the rings during intake and compression strokes, as well as reducing cylinder wash and maintaining even oil film over the entire cylinder wall.

A further object of the invention is the provision of a device of this character, wherein lubrication is improved by reducing oil cutting during gas seepage by rings on the piston, the device being effective for centering the piston in the cylinder of the engine, and produces a counter force against the said piston during the period that slap occurs at the top and bottom of the piston stroke, resulting in a reduction in piston wear and braking action which coupled with the inertia of the reciprocating parts decreases power.

A still further object of the invention is the provision of a device of this character, which is simple in construction, thoroughly reliable and efficient in operation, strong, durable, readily and easily applied and removed, and inexpensive to manufacture and install.

With these and other objects in view, the invention consists in the features of construction, combination and arrangement of parts as will be hereinafter more fully described, illustrated in the accompanying drawing, which shows the preferred embodiment of the invention, and pointed out in the claims hereunto appended.

In the accompanying drawing:

Figure 1 is a horizontal transverse sectional view through a piston of an engine showing the device constructed in accordance with the invention applied.

Figure 2 is a fragmentary vertical central sectional view through the piston.

Figure 3 is a sectional view taken on the line 3—3 of Figure 2 looking in the direction of the arrows.

Figure 4 is an elevation of the device removed.

Figure 5 is a top plan view thereof.

Similar reference characters indicate corresponding parts throughout the several views in the drawing.

Referring to the drawing in detail, A designates generally a portion of a piston which as usual reciprocates within a cylinder, not shown, of an internal combustion engine, which is also not shown. Within a groove in the piston is seated a split, and overlapping piston ring B, which is of any and ordinary well known construction, and in association with the groove and ring is the device constituting the present invention, as will be hereinafter more fully described.

The device comprises a pair of substantially T-shaped members 10, each formed from a single strip of inherently stiff material, bent on itself to provide a pair of reversely extending wings 11, these being curved correspondingly to the curvature of the piston A, exteriorly thereof within the groove for the ring B, and a doubled over central stem or shank 12, respectively. Each member 10 is of a width to snugly fit comfortably within the groove for the ring B, to have the wings 11 confined within such groove, while the stem or shank 12 plays through a clearance 13 therefor, as cut through the piston wall for opening through the outer and inner faces thereof.

The member 10 in its stem or shank 12, has formed a substantial L-shaped slot 14, which opens through the top edge of the said stem or shank to be exposed interiorly of the piston.

Removably engaged within the slot 14 is the cross-connecting intermediate portion 15 of a tensioning bail having the outwardly divergent pressure terminals 16, which engage with the ring B at the portions thereof next to such terminals, so as to force the said ring outwardly against the cylinder wall, the bails being located within the hollow of the piston, and are disposed approximately opposite each other in association with the pair of members, which are located, as best seen in Figure 1 of the drawing.

The members 10 are in reality hangers for the expander bails, and also such members function as detachable couplings for the bails and piston B.

The locating of the bails behind the piston wall prevents contact of burning gases therewith and assures retention of its tension, as well as permitting a heavy enough spring to be used to obtain the utmost efficiency.

From the foregoing, it is thought that the construction, manner of application and operation of the device will be clearly understood, and therefore, a more extended explanation has been omitted for the sake of brevity.

What is claimed is:

1. A piston ring expander, comprising a hanger having a stem removably passed through the piston from the outside through the piston ring groove for anchorage therein, and expanding means removably engaged with the stem at the inner area of the piston for expanding action on the ring at plural points thereof.

2. A piston ring expander, comprising a hanger removably engaged through a wall of the piston to project to the interior of said piston, and having a receiving seat within the latter, an expander bail detachably engaged with the seat and resiliently active on the piston ring at several points thereof and a head on the hanger to abut the wall of the piston at the outer side thereof.

3. A piston ring expander, comprising a hanger having a headed stem removably passed through the piston from the outside through the piston ring groove and having a seat at its inner end, and a spring expanding means removably engaged in said seat and having turned ends passing through openings in the piston for engagement with the piston ring within the groove.

4. A piston ring expander, comprising a hanger having a headed stem removably passed through the piston from the outside through the piston ring groove and having a bayonet slot seat at its inner end and an outwardly bowed spring expanding means removably engaged in said seat and having turned ends passing through openings in the piston for engagement with the piston ring within the groove.

ALEXANDER G. FAWNS.